UNITED STATES PATENT OFFICE.

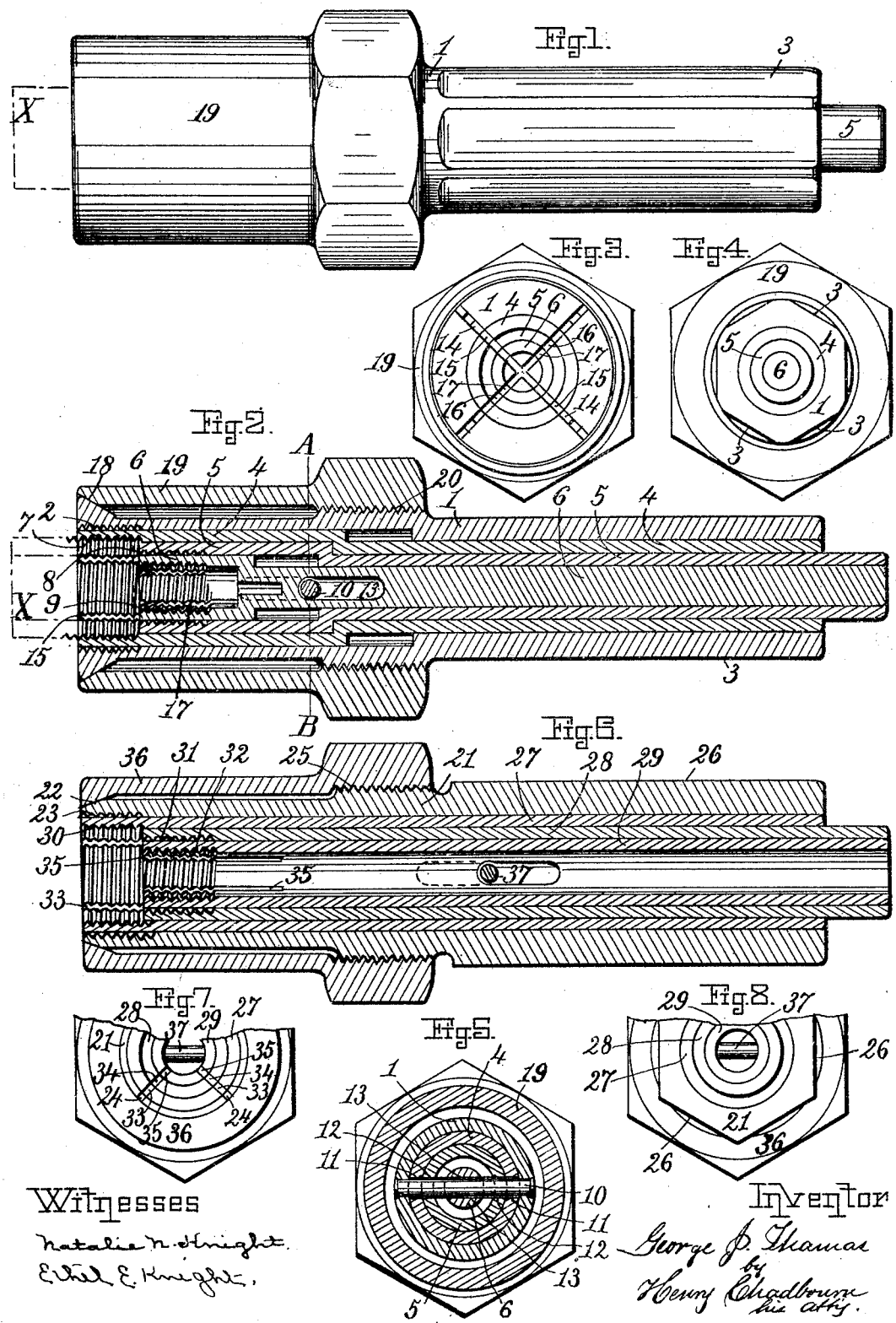
G. J. THOMAS.
CHUCK.
APPLICATION FILED NOV. 23, 1908.
958,980.
Patented May 24, 1910.

GEORGE J. THOMAS, OF WATERTOWN, MASSACHUSETTS, ASSIGNOR TO CHARLES E. CHESTER, OF BOSTON, MASSACHUSETTS.

CHUCK.

958,980.  Specification of Letters Patent.  Patented May 24, 1910.

Application filed November 23, 1908. Serial No. 464,182.

*To all whom it may concern:*

Be it known that I, GEORGE J. THOMAS, of Watertown, in the county of Middlesex and State of Massachusetts, have invented certain new and useful Improvements in Chucks, of which the following is a specification.

This invention relates to improvements in chucks and has for its objects to provide a chuck to receive and hold pipes or tubings of different sizes or diameters and which will be easily and quickly adjusted to the different sizes to which it is applicable. It is designed more especially to hold short pieces of the pipe or tubing while they are being operated upon in forming short nipples thus making it practicable to utilize the short pieces of pipe and tubing which would otherwise be liable to be wasted or discarded as useless. The improved chuck is also useful as a means whereby nipples, which form gas outlets and only have their threaded ends projecting from the wall or ceiling or in other positions to be operated upon, may be unscrewed and removed or replaced without injury to the threads thereon.

The invention consists of the novel constructions, arrangements and combinations of parts substantially as illustrated and described herein and it is carried out substantially as illustrated on the accompanying drawing which forms an essential part of this specification and whereon like characters of reference refer to like parts wherever they occur thereon.

On the drawing: Figure 1 represents a side elevation of one arrangement of my improved chuck, showing a short piece of pipe or tubing of one of the different sizes to which the chuck is applicable, held by the chuck, such piece of pipe or tubing having been shown in construction lines. Fig. 2 represents a central longitudinal section of the chuck shown in Fig. 1, also showing the piece of pipe or tubing held thereby, the same being shown in construction lines. Fig. 3 represents an end view of the chuck shown in Figs. 1 and 2, as seen from the end of the chuck at which the pipe or tubing is inserted. Fig. 4 represents a view of the opposite end of the same chuck from that shown in Fig. 3. Fig. 5 represents a cross section of the chuck on the line A—B shown in Fig. 2. Figs. 6, 7 and 8 represent views similar to Figs. 2, 3 and 4 respectively but of a different arrangement of the chuck.

Referring to the chuck shown in Figs. 1 to 5 inclusive: the chuck has an outer tubular casing 1 which is provided at one end with an internal screw thread 2 to fit upon the external screw thread on the largest pipe or tubing to which the chuck is applicable. The opposite end of the casing 1 is provided with means, as the hexagonal outer surface 3, or other means, whereby it may be held within a vise or turned by a suitable wrench or brace applied thereto. Within the casing 1 is placed one or more tubular members 4, 5 and 6, according to the number of the different sizes of the pipe or tubing to which the chuck is applicable, as will be fully understood by the complete description of the chuck herein contained (three of such tubular members having been shown on the drawing). The outer casing fits closely upon the member 4 and the other members 5 and 6 fit closely within the next outer member, thus forming a series of concentric tubes fitting closely within each other but each tube easily adjustable longitudinally in relation to the others. The tubes 4, 5 and 6 are each provided with the respective internal screw threads 7, 8 and 9 at the end thereof corresponding with the screw thread 2 on the outer casing 1, which internal screw threads fit upon the threads of the various sizes of the pipes or tubings to which the chuck is applicable. In order to allow of the longitudinal adjustment of the inner tubes within the outer casing; to limit the amount of the adjustment of the same; and to prevent the rotation of such parts relative to each other, I prefer to insert a pin 10 through the outer casing and through slotted perforations 11, 11, 12, 12, 13 and 13 through the respective tubes 4, 5 and 6. In order to provide sufficient strength in the outer casing without making it bulky, I prefer to reduce the parts of the inner tubes at the opposite ends thereof to those which receive the pipes or tubings to be held thereby, but such a reduction is not absolutely necessary as will be understood by the description of the invention as shown in Figs. 6, 7, and 8. In order to hold the different pipes or tubings from turning within the respective threads 2, 7, 8 and 9, after they have been inserted therein, it is necessary that the ends of the casing 1 and of the tubes 4, 5, and 6 should be capable of being reduced in diameter or contracted and thereby produce sufficient friction between such parts and the pipes or tubings therein to prevent the pipes from turning and thus obtain the desired result. This I accomplish by splitting the casing 1 and the tubes 4, 5 and 6 at several places as shown at 14, 15, 16 and 17 respectively and in Figs. 2 and 3 and also providing means whereby the casing and tubes may be contracted upon the pipes or tubings. The means for contracting the casing and inner tubes, as shown on the drawing consists of the tapered portion 18 on the exterior of the casing combined with a sleeve 19 mounted upon the outside of the casing and having an internal screw thread meshing into a screw thread 20 on the exterior of the casing and adjusting the sleeve upon the casing thereby in a longitudinal direction. The thread 20 is preferably a left-handed thread. The end of the sleeve 19, when adjusted longitudinally on the casing by the action of the thread 20, engages the tapered portion 18 on the casing and contracts the casing and any of the inner tubes which are so adjusted as to be acted upon by the contraction of the outer casing. This contraction of the outer casing and contained inner tubes presses such parts against or upon any pipe or tubing which may be inserted within said casing or any tube therein. This means of contraction of the casing thus described is not essential to the invention as other and well known equivalent means may be substituted therefor as will be understood by the complete description of the invention herein contained. The tubes 4, 5, and 6 are preferably made the same length as that of the outer casing so that they may be easily moved from outside the casing in order to return them to their normal positions after they have been moved longitudinally outward by the insertion of a tubing or pipe of larger size than that to which they are applicable, as they will consequently project a distance equal to their longitudinal adjustment, as clearly shown by Figs. 1 and 2. By this means it will be seen that the tubes are easily pushed back into place when the chuck is to be used to hold a pipe or tubing of smaller diameter.

On Figs. 1 and 2 I have shown, in construction lines, a pipe or tubing X introduced and held within the internal screw thread of the inner tube 4 which tubing or pipe X has caused the inner tubes 5 and 6 to be moved longitudinally outward and so that they project from the opposite end of the casing a distance substantially equal to the distance that the pipe or tubing X has been screwed into the opposite end of the tube 4. The pipe or tubing X as shown, is ready to be operated upon, either to cut it off, to cut a thread thereon, or to turn it into or from any pipe or tubing fitting, such as an elbow, and any other fitting.

Referring to the construction or arrangement of the chuck as shown in Figs. 6, 7 and 8, the outer casing 21 is made cylindrical at one end and provided near the extreme end of the cylindrical portion with the external tapered surface 22, the internal screw thread 23, and is split longitudinally at several places as shown at 24 so as to make the end of the casing contractible. The opposite end of the cylindrical portion of the casing is supplied with an external screw thread 25, which thread is preferably a right handed thread. The portion 26 of the casing is formed so as to receive a suitable wrench or to allow of the casing being held in a vise and said portion is preferably made hexagonal as shown. Within the casing 21 is arranged the plurality of concentric tubes 27, 28 and 29 which are of uniform diameter throughout and provided near their forward end with the respective internal screw threads 30, 31, and 32. These tubes are also provided with the respective longitudinal splits 33, 33, 34, 34, 35 and 35 so that each tube is capable of being contracted in diameter. A sleeve 36 is mounted upon the exterior of the cylindrical portion of the casing 21 and is adjusted thereon by means of the screw thread 25 which meshes into an internal screw thread on said sleeve. The interior of the sleeve is provided with an inclined portion which engages the tapered portion 22 on the outer casing and thereby causes the casing 21 and the desired number of inner tubes to be contracted or allowed to expand as desired. The tubes 27, 28 and 29 are prevented from turning within the outer casing or relative to each other by means of the pin 37 which passes through the walls of the outer casing and through slotted perforations in the inner tubes.

The operations and uses of the chuck arranged as shown in Figs. 6, 7 and 8 are the same as those of the chuck shown in the other views, and in many ways the construction shown in Figs. 6, 7 and 8 is the preferred construction as it is less expensive to manufacture or to keep in order.

By the use of my improved chuck, I am able to firmly hold a pipe or tubing by a very short piece of the threaded end of the same and without injury to the thread thereon and I can therefore use very short pieces of the pipe or tubing in the manufacture of short nipples; can hold the pipe or tubing firmly while it is being operated upon by other tools; and can remove pieces of pipe or tubing from their fittings even when they project but slightly from the fitting or from other objects. This is very convenient in removing the pipes or tubings which form the gas outlets in a building which frequently project but slightly from the wall or ceiling of the building and on which the threads are usually ruined when a common pipe wrench is used.

Having thus fully described the nature, construction and the operation of my invention, I wish to secure by Letters Patent and to claim:

A chuck composed of a tubular casing screw threaded on the interior at one end thereof and contractible at said screw threaded portion, a plurality of tubes longitudinally adjustable within said casing each tube internally screw threaded at one end thereof and contractible at said screw threaded portion, and means on the exterior of the casing to contract said casing and any desired number of the contained tubes.

In testimony whereof I have affixed my signature, in presence of two witnesses.

GEORGE J. THOMAS.

Witnesses:
E. B. HUNT,
I. F. HUNT.